Jan. 29, 1952 R. W. LEE 2,584,034
ELECTRONIC MARKER CIRCUIT
Filed Sept. 14, 1945
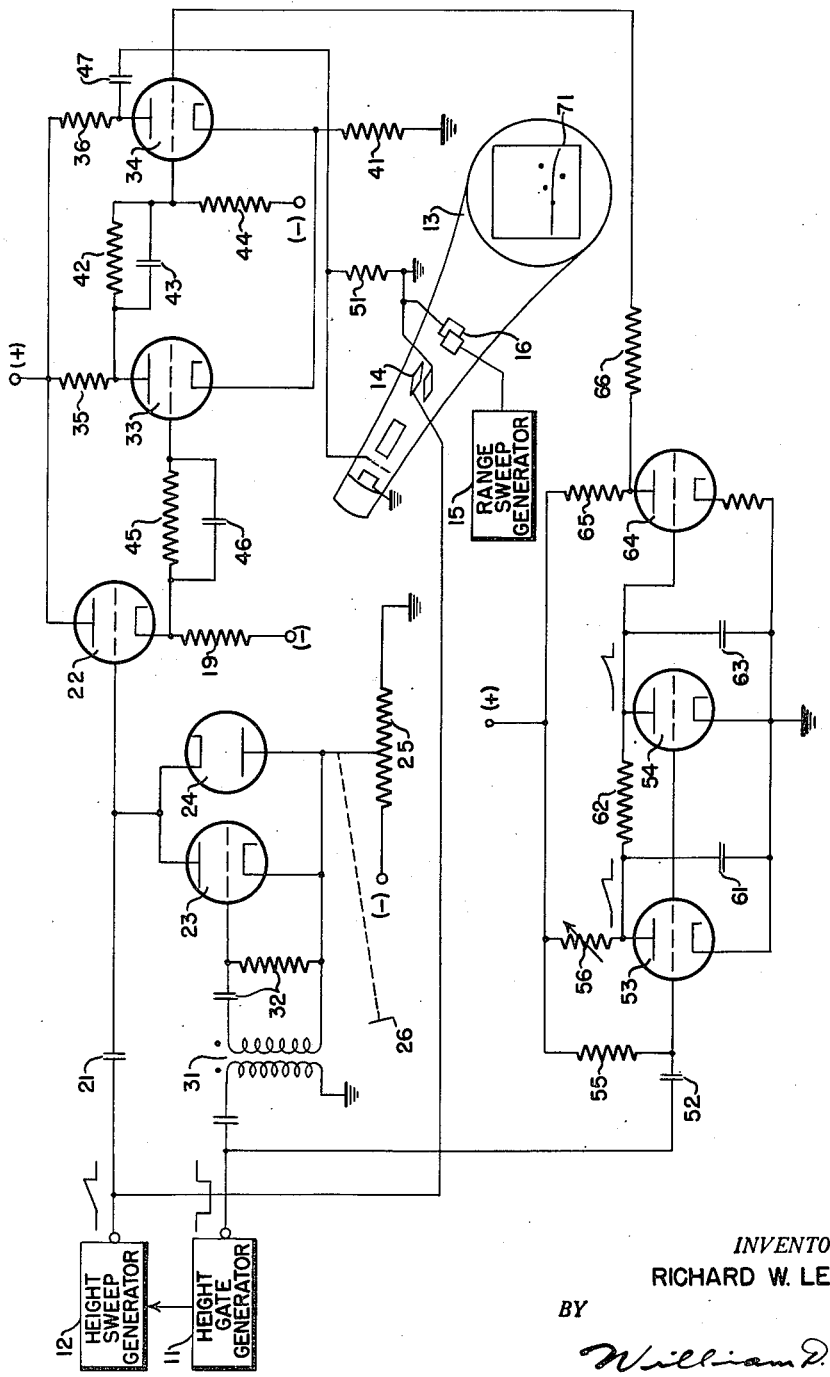
*INVENTOR.*
RICHARD W. LEE
BY
William D. Hall
ATTORNEY Patented Jan. 29, 1952

2,584,034

UNITED STATES PATENT OFFICE 2,584,034

ELECTRONIC MARKER CIRCUIT

Richard W. Lee, Watertown, Mass., assignor, by mesne assignments, to the United States of America as represented by the Secretary of War Application September 14, 1945, Serial No. 616,376

5 Claims. (Cl. 343—5)

This invention relates to electrical circuits and more particularly to such circuits adapted to generate voltage pulses.

In certain radio object-locating systems information concerning the height and range of observed targets is portrayed on cathode ray tubes. In such systems a height marker is desirable to indicate the altitude of observed targets such as aircraft. The marker should preferably be electronic in nature and present an illuminated trace on the cathode ray tube. Furthermore, such a marker should be movable so that it may be caused to intersect any desired target indication. An additional desirable feature would be to have the height line distorted in accordance with range to correct for the curvature of the earth.

It is an object of the present invention, therefore, to provide an electronic height marker which may be adjusted to a given target indication on a cathode ray tube indicator.

It is a further object of the present invention to provide an electronic height marker for use in conjunction with a range-height indicator which is corrected for the earth's curvature.

For a better understanding of the invention, together with other and further objects thereof, reference is had to the following description taken in connection with the accompanying drawing in which the single drawing illustrates schematically a preferred embodiment of the present invention.

In presenting range-height data concerning observed targets, the search antenna is caused to scan in elevation. It may, of course, be scanned in azimuth at the same time. The presentation on the cathode ray tube is obtained by applying a range sweep voltage to the horizontal deflecting plates or coils thereof while at the same time applying a height sweep voltage to the vertical deflecting plates or coils. The range sweep voltage should be a sawtooth voltage, the slope of which is proportional to cosine $\theta$, where $\theta$ is the elevation angle of the antenna. The height sweep voltage should be a sawtooth voltage, the slope of which is proportional to sine $\theta$. In shipborne installations of radio object-locating equipment having range-height indication the elevation angle $\theta$ generally does not exceed ten to fifteen degrees and the approximations, cosine $\theta=1$ and sin $\theta=\theta$, are sometimes made.

Reference is now had to the drawing which illustrates schematically the present invention comprising a height gate generator 11 which is connected to a height sweep generator 12. The height gate generator may be any device well known in the art, such as a multivibrator which will provide a rectangular voltage pulse during the time it is desired to present information on a cathode ray tube indicator 13. The cathode ray tube indicator 13 is shown utilizing electrostatic deflection but magnetic deflection may of course be used if desired. The height sweep generator 12 may be any sawtooth generator well known in the art. The generator 12 is electrically connected to the vertical deflecting plates 14 of indicator 13. A range sweep generator 15 is electrically connected to the horizontal plates 16 of indicator 13 and may be any type of sawtooth generator well known in the art. The height sweep generator 12 is connected through a coupling capacitor 21 to a control grid of a vacuum tube 22. The vacuum tube 22 is connected as a cathode-follower amplifier having its anode returned to a suitable source of positive potential and having its cathode returned through a suitable resistor 19 to a source of negative potential. A vacuum tube 23, preferably of the triode type, is connected in parallel with a vacuum tube 24, which is preferably the diode type. The anode of tube 23 is connected to the cathode of tube 24 and to the aforementioned control grid of tube 22. The cathode of tube 23 is connected to the anode of tube 24 to a tap on a potentiometer 25. The potentiometer 25 is connected between a suitable source of negative potential and ground. A handwheel 26 or other suitable adjusting means is connected to the tap of the potentiometer 25 for adjustment thereof. The height gate generator 11 is suitably connected through a transformer 31 and a capacitance-resistance coupling network 32 to a control grid of the vacuum tube 23. The cathode of vacuum tube 22 is connected to a flip-flop or one-shot multivibrator which utilizes vacuum tubes 33 and 34, these tubes being preferably of the triode type. The tubes 33 and 34 have plate load resistors 35 and 36, respectively, and a common cathode resistor 41. The anode of tube 33 is connected to the control grid of tube 34 through a parallel combination of a resistor 42 and capacitor 43. The control grid of tube 34 is connected through a resistor 44 to a suitable source of negative potential. The cathode of tube 22 is connected to the control grid of tube 33 by a parallel combination of a resistor 45 and capacitor 46. The output of the multivibrator at the anode of tube 34 is connected through a differentiating circuit formed by a series capacitor 47 and a shunt resistor 51 to an intensifying grid of the indicator 13. The height gate generator 11 is also connected through a suitable coupling capacitor 52 to the control grids of vacuum tubes 53 and 54. The control grids of vacuum tubes 53 and 54 are returned through a common resistor 55 to a suitable source of positive potential. The anode of tube 53 is connected through a resistor 56, preferably of the variable type, to a source of positive potential. A capacitor 61 is connected from the anode of tube 53 to ground. A resistor 62 connects the anode of tube 53 to the anode of tube 54. A capacitor 63 is connected between the anode of tube 54 and ground. The cathodes of tubes 53 and 54 are also returned to ground. The anode of tube 54 is connected to a suitable amplifier which includes a vacuum tube 64 having plate load resistor 65. The anode of tube 64 is connected through a resistor 66 to the control grid of tube 34 in the multivibrator.

In the operation of the present invention the vacuum tube 23 is normally in a conducting state, i. e., plate current flows therein when the output from the height gate generator is zero; and vacuum tube 22 is normally in a nonconducting state as is vacuum tube 33. Between sweeps, i. e., when the output from height gate generator 11 is zero, vacuum tubes 34, 53, and 54 will be in a conducting state. It will be seen that the tubes 23 and 24 are so arranged that in the absence of a signal from the generator 11 the control grid of tube 22 will be maintained at a potential which is determined by the setting of the potentiometer 25. Assume now that the negative gate or voltage pulse is applied from the generator 11. This negative voltage will render the tube 23 nonconducting, and the control grid of tube 22 will be free to rise in potential. The sawtooth voltage from the height sweep generator 12 is applied through the capacitor 21 to the control grid of tube 22. Since the tube 22 is in a nonconducting state, and since the sawtooth voltage from generator 12 is substantially linear, the time interval before tube 22 conducts is dependent upon the setting of handwheel 26 and potentiometer 25. After the tube 22 starts conducting, the cathode of this tube will start to rise in a sawtooth manner as will the control grid of vacuum tube 33. The vacuum tube 33 was initially nonconducting; however, after a time interval, the voltage at the cathode of tube 22 will rise sufficiently to cause the tube 33 to conduct. When the tube 33 conducts, the anode potential thereof will drop. This will cause the control grid voltage of tube 34 to drop, thus decreasing the current through tube 34 and decreasing the voltage on the cathodes of tubes 33 and 34. This decrease in cathode voltage on tube 33 leads to a further increase in current and a further drop in anode voltage. This cumulative action of a multivibrator is well known in the art. The tube 34 which was normally conducting will now be cut off, and the anode potential thereof will rise sharply. This sharp rise in voltage is differentiated by capacitor 47 and resistor 51 and applied to the intensity grid of the indicator 13 to produce a bright spot on the screen. The time of occurrence of this pulse or trace is determined by the setting of the handwheel 26 and will form a line such as 71 at a constant height on the screen of the indicator 13 as the antenna of the associated radio object locating equipment completes one complete elevation cycle.

If no corrections are made, the line 71 will be a straight line. However, due to the curvature of the earth, it will not represent the actual height of the targets at any except zero range. It can be shown that the error in height due to the earth's curvature is very closely proportional to the range squared. A voltage proportional to range squared, which may be used for correcting the position of the height line, may be obtained by integrating a linear sawtooth voltage. This result is achieved by the circuits associated with tubes 53 and 54. The tube 53, together with its load resistor 56 and capacitor 61, is essentially a sawtooth generator. The voltage across the capacitor will rise linearly during the time the tube 53 is rendered nonconducting by the gage voltage from the generator 11. This sawtooth voltage is applied to a second sawtooth generator which comprises tube 54, resistor 62, and capacitor 63. The voltage across the capacitor 63 will be approximately proportional to the range squared. This voltage is amplified by the amplifier including tube 64 and applied to the control grid of tube 34 in the multivibrator. Decreasing the voltage on the control grid 34 will decrease the voltage on the cathode of tube 33 and thus decrease the time interval between the time of conduction of tube 22 and the time of conduction of tube 33, thus advancing the time of generation of the pulse which is applied through capacitor 47 to the intensifying grid of indicator 13. This will produce a slightly curved height line which will represent the true height of targets at all ranges.

While there has been described what is at present considered the preferred embodiment of the invention, it will be obvious to those skilled in the art that various changes and modifications may be made therein without departing from the invention.

What is claimed is:

1. In a range height indicator having at least a cathode ray tube indicator, a range sweep generator connected thereto to provide range sweep, a height sweep generator and a height gate generator associated with a radio object-locating sytem, an electronic height marker circuit comprising adjustable bias means, amplifier means connected to the output of the height sweep generator, clamper meeans interposed between said bias means and said amplifier means and adapted to maintain the input to said amplifier means at a potential determined by said bias means and being further adapted to be rendered inactive by the height gate generator, multivibrator means adapted to be actuated by said amplifier means and being further adapted to produce a substantially rectangular output voltage pulse, first sawtooth generator means adapted to be actuated by the height gate generator, second sawtooth generator means adapted to intergrate the output of said first sawtooth generator means, means for applying the output of said second sawtooth generator means to said multivibrator means in such a manner as to cause said multivibrator to be actuated earlier in time by an amount dependent upon the output of said second sawtooth generator means and differentiator means connected to the output of said multivibrator means for providing a voltage pulse to the cathode ray tube indicator whereby a trace will appear on the screen of the indicator which represents the altitude of target indications which said trace intersect.

2. In a range height indicator having at least a cathode ray tube indicator, a range sweep generator connected thereto to provide range sweep, a height sweep generator and a height gate generator associated with a radio object-locating system, and electronic height marker circuit comprising amplifier means connected to the height sweep generator, level setting means associated with said amplifier means in such a manner as to cause said amplifier means to pass a signal a predetermined time interval after the beginning of the height sweep voltage from the height sweep generator and pulse generating means adapted to be actuated by said amplifier means and being further adapted to produce an indication on the cathode ray tube indicator at such times during the range and height sweeps as to produce a height line substantially representing the altitude of target indications which said line intersects.

3. In a range height indicator having at least a cathode ray tube indicator, a range sweep generator for causing range sweep thereon, a height gate generator and a height marker circuit associated with a radio object-locating system, an electronic earth curvature correction circuit comprising first integrating means adapted to be actuated by the height gate generator and being further adapted to produce a substantially sawtooth voltage therefrom and second integrating means adapted to integrate the output of said first integrating means and being associated with the height marker circuit in such a manner as to alter the time of generation of voltage pulses therefrom in accordance with the effect of the earth's curvature on the observed heights of targets.

4. In a radio object-locating system having a height-range cathode ray indicator, an electronic height marker circuit comprising means for generating a height voltage pulse a predetermined time after the beginning of a height sweep on said indicator, means for providing a voltage substantially proportional to time squared and means for altering the time of generation of said height voltage pulse in accordance with said time squared voltage whereby a trace is provided on the indicator of the associated radio object-locating equipment representing the altitude of observed targets through which said trace passes.

5. In a radio object-locating system having a height-range cathode ray indicator, an electronic height marker circuit comprising means for generating a height voltage pulse a predetermined time after the beginning of a height sweep on said indicator, means for producing a correcting voltage substantially proportional to the square of the range, and means for applying said correcting voltage to said generating means alter the time of occurrence of said voltage pulse compensated for the error due to the earth's curvature.

RICHARD W. LEE.

REFERENCES CITED

The following references are of record in the file of this patent:

UNITED STATES PATENTS

| Number | Name | Date |
|---|---|---|
| 2,346,093 | Tolson | Apr. 4, 1944 |
| 2,371,988 | Granqvist | Mar. 20, 1945 |
| 2,391,411 | Goble | Dec. 25, 1945 |
| 2,408,050 | De Rosa | Sept. 24, 1946 |
| 2,480,123 | Deloraine | Aug. 30, 1949 |
| 2,514,828 | Ayres | July 11, 1950 |